April 5, 1927.

A. F. MURRAY 1,623,745

TRANSMITTING SYSTEM FOR RADIANT ENERGY

Filed Jan. 14, 1921

INVENTOR
Albert F. Murray
BY
A. S. Gardner
HIS ATTORNEY

Patented Apr. 5, 1927.

1,623,745

UNITED STATES PATENT OFFICE.

ALBERT F. MURRAY, OF BOSTON, MASSACHUSETTS, ASSIGNOR TO JOHN HAYS HAMMOND, JR., OF GLOUCESTER, MASSACHUSETTS.

TRANSMITTING SYSTEM FOR RADIANT ENERGY.

Application filed January 14, 1921. Serial No. 437,354.

Objects of the present invention are to provide an improved transmitting system for radiant energy; to provide common means for controlling the power supplied to a circuit generating damped waves and for controlling the group frequency of the damped waves; to provide a single vacuum tube arranged to control both the power supplied to a closed, oscillatory circuit containing a spark gap and the group frequency of the waves generated by said circuit; and to provide other improvements as will hereinafter appear.

Figure 1:
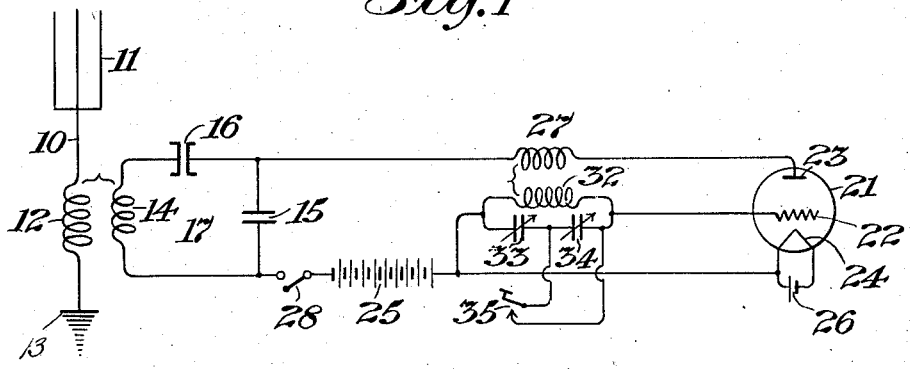
Figure 2:
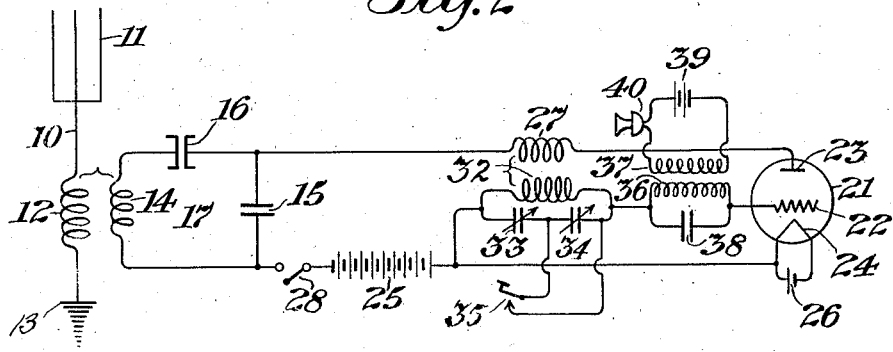

In the accompanying drawings, Fig. 1 is a diagrammatic representation of a transmitting system constructed in accordance with this invention; and Fig. 2 is a diagrammatic representation of another embodiment of the invention.

Referring to the drawing, the embodiment of the invention shown in Fig. 1 comprises an open aerial circuit 10 including an antenna 11, an inductance 12, and a ground connection 13. Inductively coupled to the coil 12 is a coil 14 forming, with a condenser 15 and a spark gap 16, a closed, oscillatory circuit 17. The spark gap 16 is normally open but is constructed and arranged so that it may be temporarily closed or short-circuited at the will of the operator. A vacuum tube 21 containing a grid 22, a plate 23 and a filament 24 heated by a battery 26 is provided, the plate 23 being conductively connected to one side of the condenser 15 of the closed circuit 17 through a coil 27, and the filament 24 being connected to the other side of the condenser 15 through a high voltage battery 25 and key or switch 28.

For controlling the generation of oscillations, the vacuum tube 21 is provided with a grid circuit comprising an inductance coil 32 and condensers 33 and 34. The coil 32 of this grid circuit is inductively coupled to the inductance 27 of the plate circuit. A key 35 is arranged to short circuit the condenser 34.

If the spark gap 16 is closed, the closing of the switch 28 will start the generation of oscillations by the vacuum tube 21, the frequency of such oscillations being controlled by the tuning of the above mentioned grid circuit 32, 33, 34. By opening and closing the key 35, the frequency of the grid circuit may be rapidly varied between a predetermined frequency, which occurs when the key 35 is open, and a lower predetermined frequency which occurs when the key is closed.

If the spark gap 16 is opened to normal position, the closing of the switch 28 will, contrary to what would ordinarily be expected, still cause generation of oscillations by the vacuum tube 21. The probable reason for this is that, upon closing the switch 28, there is a flow of current from the plate battery 28 into the condenser 15, which is charged to a potential sufficient to discharge through the inductance 14 and across the gap 16, thereby setting up damped radio oscillations in the tuned antenna system 10. The condenser 15 is thus left at some lower potential so that it may again be charged from the battery 25 through the vacuum tube 21, which acts as a self oscillating device, permitting a flow of current to the condenser 15 at definite and regular intervals. The frequency of these charging intervals is regulated by the tuning of the grid circuit of the tube 21. The gap 16 and the condenser 15 are preferably adjusted to allow one spark per oscillator cycle, and under such a condition the spark or group frequency is the same as the frequency to which the grid circuit is tuned. The group frequency therefore depends upon the values of the inductance 32 and of the capacities of the condensers 33 and 34, and is entirely independent of the radio frequency which is determined by the inductance 14 and the condenser 15.

The transmitting system connected as described in this invention is of special importance when used as a transmitter of damped waves, the group frequency of which is above audibility for example, 20,000 groups per second. In such a system signalling is accomplished by changing the group frequency from, for example, 20,000 to 21,000 groups per second by using the key 35 to short circuit the condenser 34. Messages from such a transmitter cannot be intercepted by an ordinary radio receiver because of the inaudible group frequency, but may be read on a receiver specially constructed for this purpose. Such a receiver forms the subject matter of a copending application Serial No. 155,500, filed March 17, 1917, methods of transmission of radiant energy, of John Hays Hammond, Jr., and therefore need not be described here.

The operation of the form of the present invention shown in Fig. 1 may be modified by using the switch 28 as a signalling key instead of the key 35. When this is done the transmitted messages could be received by the ordinary radio receiver because the radiated energy would vary with the dots and dashes of the key.

When it is desired to use this invention for telephony, the system shown in Fig. 1 may be modified as shown in Fig. 2 in which the construction is the same as in Fig. 1, except that a coil 36 is connected in the grid circuit of the tube 21 and is magnetically coupled to a coil 37 through which flow currents of varying amplitude from a battery source 39, when a microphone 40 is spoken into. A condenser 38 is shunted across the coil 36 for the purpose of by-passing the currents of high frequency, to which the circuit 32, 33, 34 is tuned. The voice frequency variations in the coil 37 induce in the coil 36 similar variations which are superimposed upon the current already existing in the grid circuit. Therefore, there is impressed upon the grid 22 of vacuum tube 21, an alternating voltage of the frequency of the circuit 32, 33, 34,—(in this case of 21,000 cycles per sec.) modulated at a voice frequency.

In order to receive most advantageously from such a transmitter, it is necessary successively to tune to and rectify the radio frequency carrier wave, tune to and rectify the resultant current of inaudible secondary frequency, superimposed upon which are the amplitude variations of voice frequency which are received in the telephone receiver placed in the output circuit of the last detector. To further insure secrecy, the key 35 may be periodically opened and closed while talking, provided a similar switch at the receiver is simultaneously opened and closed to change, synchronously, the tuning of said receiver. This could be done, either by hand or by mechanical means, at, for example, say, three times per minute. The opening and closing of key 35 at the transmitter effects, as hereinbefore described, a change of secondary frequency which would cause any listening-in station, capable of solving the above-mentioned double tuning combination, to lose portions of the conversation.

Some of the advantages of the present transmitter over those heretofore proposed are greater simplicity and higher efficiency due to the use of one vacuum tube in place of a plurality of tubes. The transmitter of this invention also has the advantages of higher efficiency and better operation over any known system which uses a single source of oscillating power inductively coupled to the condenser of a radio frequency generating circuit. In the present invention, it is evident that the condenser 15 of the spark gap circuit 14, 15, 16 is conductively coupled to the vacuum tube oscillator.

While but two of the many forms of the present invention have been here shown, it is to be understood that the invention is not limited to any specific construction but might be applied in various forms without departing from the spirit of the invention or the scope of the appended claims.

Having now fully described my invention, what I claim is:

1. In a transmitter of radiant energy, a circuit including a spark gap arranged to generate and radiate damped waves and a single, oscillating, three-electrode vacuum tube having its plate circuit conductively connected to and broken by the spark gap of said first-mentioned circuit for controlling the amount of power supplied to said circuit and also controlling the group frequency of said damped waves.

2. In a transmitter of radiant energy, a circuit including a spark gap arranged to generate and radiate damped waves, and a single vacuum tube arranged to control, by conductive coupling, the amount and frequency of the power suppled to said circuit, the plate circuit of said tube being broken by the spark gap in said first-mentioned circuit.

3. A wave transmission system comprising an oscillatory circuit including a spark gap and a condenser and means for supplying said circuit with energy including a thermionic oscillator comprising a container, three terminals enclosed thereby, a circuit connecting two of said terminals and including said first mentioned circuit and a source of electrical energy and said circuit being broken by said spark gap, and an oscillatory circuit connected to the third of said terminals and tuned to a predetermined frequency for controlling said oscillator.

4. A wave transmission system comprising an oscillatory circuit including a spark gap and a condenser and an inductance, and means for supplying said circuit with energy including a thermionic oscillator comprising a bulb and three terminals enclosed thereby, a circuit connecting two of said terminals including the said first mentioned circuit and broken by said spark gap and a source of energy and an inductance and a circuit connected to the third of said terminals including a plurality of condensers in series and an inductance coupled to said first mentioned inductance, and means for short circuiting a portion of the condensers of said last mentioned circuit for varying its frequency.

5. A wave transmission system comprising an open aerial circuit including an inductance, a closed, oscillatory circuit including a condenser, a spark gap, and an inductance coupled to said first-mentioned inductance, and means for energizing said closed, oscillatory circuit including a thermionic oscillator comprising a three-electrode vacuum tube, a circuit controlled by said vacuum tube and including the plate and filament of the tube, said oscillatory circuit, a source of electrical energy, and an inductance and being broken by said spark gap, and a circuit connected to said third terminal and including an inductance coupled to said third mentioned inductance and a condenser, and means for short-circuiting a portion of said last-mentioned circuit to vary the frequency thereof, said last mentioned circuit being effective to determine the group frequency of the waves emitted by said open, aerial circuit as a result of the action of the oscillator.

Signed at Boston, in the county of Suffolk and State of Massachusetts, this 6th day of October, 1920.

ALBERT F. MURRAY.